Sept. 13, 1960   A. R. SCHOLIN   2,952,209
METERING APPARATUS WITH AUTOMATIC CUT-OFF
Filed Oct. 14, 1957   2 Sheets-Sheet 1

INVENTOR
AXEL R. SCHOLIN
by: Fred Gerlach
ATTY.

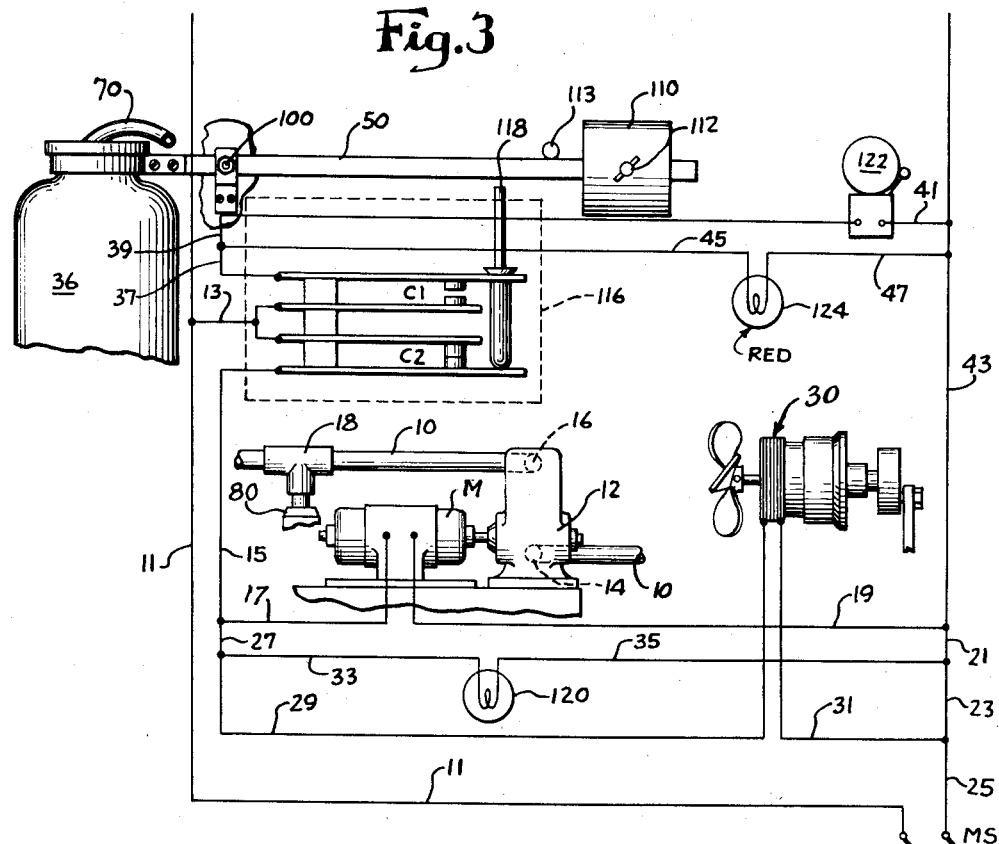
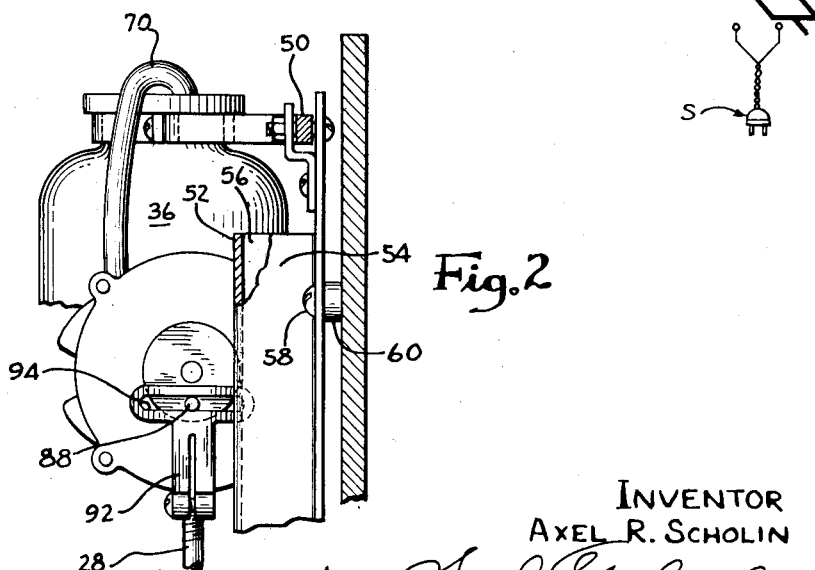

United States Patent Office 2,952,209
Patented Sept. 13, 1960

2,952,209

METERING APPARATUS WITH AUTOMATIC CUT-OFF

Axel R. Scholin, 1906 W. Newport Ave., Chicago, Ill.

Filed Oct. 14, 1957, Ser. No. 690,119

1 Claim. (Cl. 103—6)

The present invention relates to metering apparatus which is designed for use in connection with the chemical treatment of water for purification, softening, therapeutic or other purposes, as, for example, in local water treatment systems such as are commonly employed in isolated farm regions wherein chlorine, a softening solution, fluorine, or other chemical substance in liquid form or in solution is introduced in measured quantities into water which is undergoing pumping through a conduit leading from a well, spring, or other source of water and extending to a storage tank or reservoir, from which the chemically treated water may subsequently be withdrawn for household, farm or other uses.

The invention is particularly concerned with a metering apparatus of this type having associated therewith novel means whereby when the supply of treatment liquid in the supply tank, which usually is in the form of a jar or bottle, becomes depleted, the system will automatically be shut down while at the same time a visible or audible signal, or both, will be rendered, thereby indicating to the operator of the system the fact that replenishment of the treatment liquid is in order.

The invention has been illustrated and described herein as being applied to a metering apparatus of the type shown and described in my copending application Serial No. 660,120, filed May 20, 1957, for Metering Apparatus, which apparatus, although illustrated as being applied to a commercial water treatment system is equally applicable to isolated farm and other systems such as those for which the present invention is intended.

Briefly the present invention contemplates the provision of a metering apparatus which operates on the injection principle to periodically force a small measured quantity or charge of treatment liquid from a supply of such liquid, which in the present instance is in the form of a bottle-like container, into a water pipe or other conduit through which the liquid undergoing treatment is being pumped. In the illustrated apparatus the pumping means for the treatment liquid depends for its intake upon the flow by gravity of the treatment liquid from the fluid source which is maintained elevated above the level of the pumping means so that the liquid will flow to the pumping means entirely under the action of gravity. In view of the fact that the liquid being metered is introduced to the pump under very low pressure, the latter is connected to the supply container by a flexible tube which is not obliged to withstand pressures much in excess of atmospheric pressure. The container is of the portable variety and, according to the present invention, it is carried on a pivoted balance arm having an adjustable counter weight associated therewith, the position of which may be shifted in one direction or the other for counterbalancing purposes. The counterweight is adapted to be so positioned on the balance arm that when the container is filled or partially filled with the treatment liquid, the balance arm will assume one extreme position and so that when the supply of treatment liquid in the container has been substantially exhausted so that the container is empty, or nearly so, the balance arm will assume another extreme position. A microswitch or similar contact actuating device is provided with an actuating finger which is positioned in the path of movement of the balance arm. The microswitch has associated therewith a pair of normally open contacts and a pair of normally closed contacts each of which pair of contacts is adapted to become reversed when the actuating finger of the switch is depressed. During normal functioning of the system when there is an adequate supply of the treatment liquid in the supply container, the normally closed pair of contacts serves to maintain the electrical circuits for the treatment liquid pump and the water pump respectively energized so that the two instrumentalities will remain in operation. The normally open pair of contacts associated with the microswitch serves to maintain the electrical circuits for both the visible and audible signals deenergized. When the supply of treatment liquid in the supply container becomes depleted, the balance arm will, due to the decreased overall weight of the container and its contents, shift its position so as to reverse the positions of the contacts associated with the microswitch. Opening of the normally closed contacts will thus open the motor circuits which control the operation of the two pumps, while closing of the normally open pair of contacts will energize the audible and visible signals. The provision of an apparatus of the character briefly outlined above being among the principal objects of the invention, it is another object to provide an automatically operable control and signal system for a metering pump which may be manufactured as original equipment for the apparatus or which may be applied to existing apparatus without appreciable modification of the same.

Numerous other objects and advantages of the invention, not at this time enumerated, will become more readily apparent as the following description ensues.

In the accompanying two sheets of drawings forming a part of this specification, a preferred embodiment of the invention has been illustrated in connection with a water treatment system of the type illustrated and described in my abovementioned copending application.

In these drawings:

Fig. 2 is a sectional view taken substantially along the line 2—2 of Fig. 1, and Fig. 3 is an electrical circuit diagram for the system.

Figure 1:
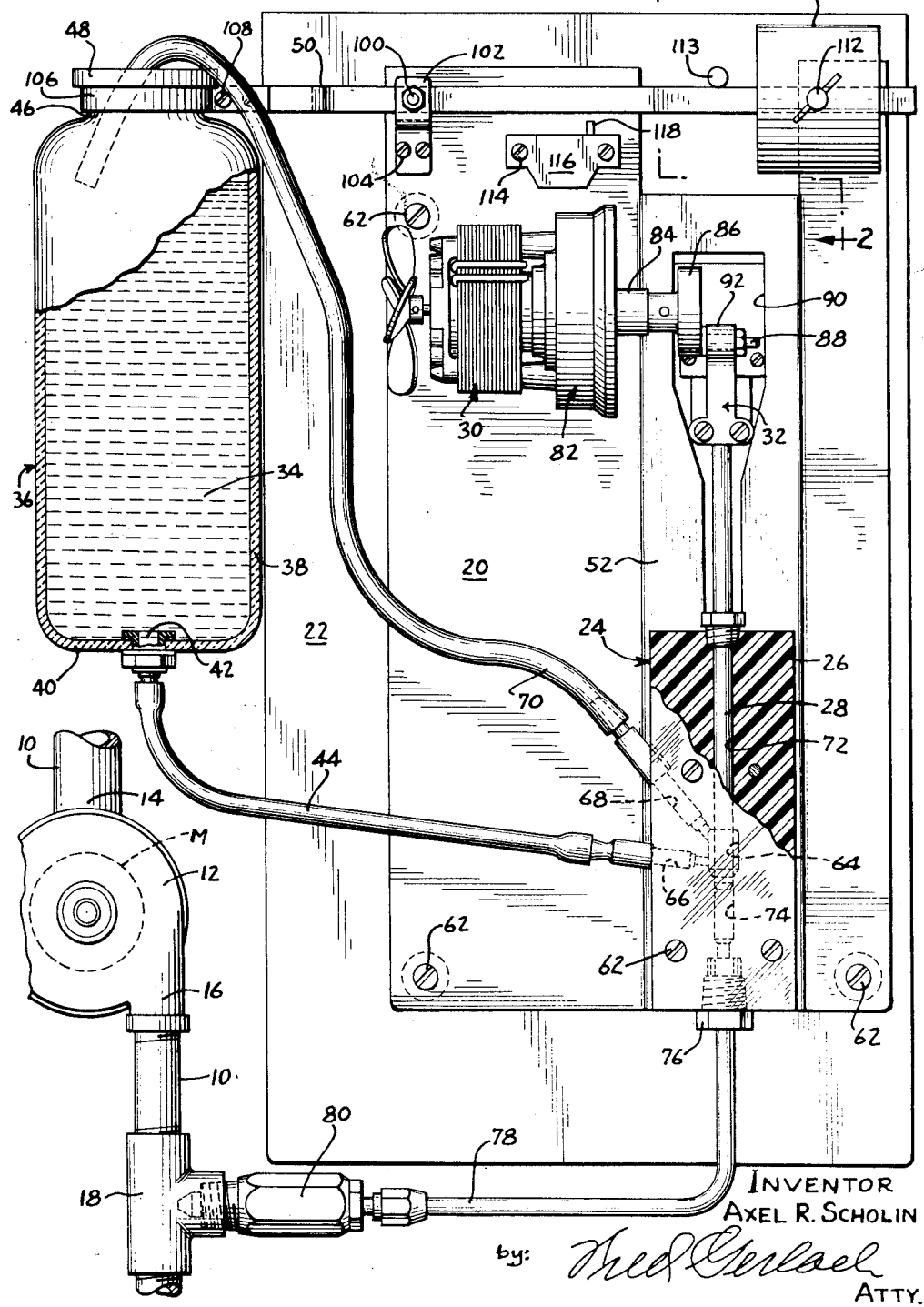
Fig. 1 is a front elevational view of a metering apparatus constructed in accordance with the principles of the present invention and showing the same operatively connected in a water treatment system.

Referring now to the drawings in detail and in particular to Figs. 1 and 2, the control system of the present invention has been shown as being applied to a water purification or treatment system of the type shown and described in my above-mentioned copending application wherein a suitable additive, which may be a chlorine solution in the case of water purification, a base solution in the case of water softening, or a fluoride in the case of therapeutic fluoridation, is forced into the water which is in transit through a pipe 10 leading from a source of water, which may, for example, be a drilled well reservoir or the like, to a suitable storage tank (not shown). A water pump 12 of conventional design is interposed in the line 10 and has its intake side 14 in communication with the source and its discharge side 16 in communication with the storage tank. The pump 12 is adapted to be driven by a suitable electric motor 30. The treatment liquid is adapted to be forcibly injected into the line 10 through a T-fitting 18, two legs of which are connected in the line 10 and a third leg of which communicates with the outlet or discharge side of the liquid treatment pump in a manner that will be made clear presently.

Briefly, the pumping system with which the present control mechanism is associated includes an apparatus which involves in its general organization a base plate or panel member 20 adapted to be placed in a vertical position and secured to a wall surface or the like 22 and on which there is operatively mounted an injection pump assembly 24 including a pump body 26 in which there reciprocates a pumping plunger 28 having a driving motor 30 therefor. A train of driving mechanism designated in its entirety at 32 serves to operatively connect the motor 30 and plunger 28 in driving relationship. A supply of the treatment liquid 34 is contained within a supply container 36, the latter preferably being in the form of a flexible plastic bottle-like structure impervious to the deleterious chemical action of acids. The container 36 is formed with a cylindrical side wall 38, a bottom wall 40 having a connection 42 communicating with a flexible conduit 44 leading to the pump structure 24, and a reduced neck portion 46 provided with a radial flange 48 thereon. The container 36 is suspended by its neck portion 46 from a balance arm 50 constituting an element of the present invention and the nature and function of which will be set forth presently. The container 36, under the influence of the pump assembly 24 is adapted to discharge its contents in metered quantities, which quantities are delivered by the pump to the water conduit 10, all in a manner that will appear presently.

The mounting plate or panel 20 is in the form of a generally rectangular sheet metal plate which may be formed as a stamping and which is provided with an offset portion 52 connected by webs 54 and 56 to the main body of the panel and defining with said webs a generally U-shaped channel. The panel 20 is secured to the wall surface 22 in spaced relation by means of spacer studs 58 and washers 60 at the four corners of the panel 20.

The pump body 26 is in the form of a solid generally rectangular block which is preferably formed of a suitable transparent plastic material such as "Lucite" and is fixedly secured in position on the outside front surface of the forwardly offset portion 52 of the panel 20 near the bottom thereof, suitable elongated fastening screws 62 being provided which extend completely through theh block and are threadedly received in the offset portion 52. Formed medially of the block 26 at a region midway between the side faces thereof and somewhat below the horizontal mid-plane of the block is a small internal cavity 64 which serves as a reservoir for the temporary storage of a small quantity of the treatment liquid 34 and which will hereinafter be referred to as the pump chamber. The pump chamber 64 communicates with a duct 66 which extends laterally therefrom at a slight incline and which is operatively connected to the flexible conduit 44.

The pump chamber 64 communicates with a second duct 68 which extends outwardly and upwardly at an incline and which is connected to a flexible conduit 70, the upper free end of which extends through the neck portion 46 of the supply container 36. The duct 68 and the flexible conduit 70 serve the dual function of bleeding the pump chamber 64 to the atmosphere at all times for the escape of accumulated gas, as well as for returning excess fluid to the container 36.

The pump body 26 is formed with a vertical bore 72 of cylindrical configuration above the chamber 64, the bore being of somewhat less diameter than that of the pump chamber. The upper end of the bore 72 is open while the lower end thereof communicates with the pump chamber 64. The bore 72 constitutes a guideway for the vertically reciprocable pump plunger 28. A second vertical bore or duct 74 is disposed below the chamber 64, the lower end of this duct communicating through an attachment nipple 76 with a conduit 78 which in turn communicates through a unidirectional check valve 80 and the T-fitting 18 with the water conduit 10.

The mechanism 32 for reciprocating the plunger 28 is adapted to be driven from the electric motor 30 which is mounted adjacent the upper left hand corner of the panel 20 is seen in Fig. 1 and which is operatively connected to a gear reduction device 82 having an output shaft 84 which extends horizontally and is spaced forwardly from the offset portion 52 of the panel. The output shaft 84 of the gear reduction device 82 has secured thereto a driving disc 86 carrying an eccentric crank pin 88. A clearance slot 90 is formed in the offset portion 52 of the panel and the peripheral regions of the disc 86 extend into this clearance slot. A split follower yoke 92 is formed with an elongated slot 94 in the upper regions thereof through which slot the eccentric pin 88 extends. The upper end of the plunger 28 is received in the follower yoke 92 and is vertically adjustable therein to vary the stroke of the plunger 28 when desired.

In the operation of the pumping mechanism briefly described above the plunger 28 is movable between an upper position wherein the lower end thereof is withdrawn from the duct 74 and assumes a position medially in the pumping chamber 64, and a lower position wherein the lower end of the plunger is forced into the duct 74 an appreciable distance. In the upper position of the plunger 28 fluid may issue from the container 36 and pass through the flexible conduit 44 and duct 66 to completely fill the chamber 64 and bore 74. When the plunger moves downwardly under the influence of the crank pin 88, the fluid in the bore 74 displaced by the lower end of the plunger is forced into the conduit 78 and the column of fluid in this conduit and in the injection check valve 80 is advanced through the check valve and introduced into the water pipe 10 through the T-fitting 18 wherein it commingles with the water being conducted to the storage reservoir or to any other suitable region of discharge.

The specific nature of the pumping apparatus described above forms no part of the present invention and no claim is made herein to any novelty associated with the same, the novelty of the present invention residing rather in the means whereby, when the contents of the container 36 has been substantially depleted, the apparatus is disabled so that no further pumping operations will take place and a suitable signal is rendered, thereby calling the operator's attention to the fact that the container 36 requires replenishment.

Still referring to Figs. 1 and 2, and additionally to Fig. 3, the balance arm 50 is in the form of an elongated rigid metal bar which is mounted intermediate its ends for limited rocking movement about the axis of a pivot pin 100. The pivot pin 100 is supported at opposite ends in the panel 20 and in a bracket 102 which is secured as at 104 to the panel. A strap or collar 106 encircles the neck portion 46 of the container 36 and has its end secured as at 108 to the forward end of the arm 50 and serves to suspend the container in an operative position at one side of the pumping apparatus. A counterweight 110, which may be in the form of a cylindrical mass is adjustably mounted for sliding movement along the rear end of the arm 50 and is capable of being clamped in any desired position of adjustment by means of a wing nut and bolt assembly 112. A limit stop 113 projects forwardly from the wall surface 22 and limits the extent of counterclockwise swinging movement of the balance arm 50 as viewed in Fig. 1.

Suitably secured by means of clamping screws 114 to the panel 20, and underlying the medial regions of the balance arm 50 is a microswitch assembly 116 having associated therewith a depressible operating finger 118 designed for engagement with and actuation by the underneath surface of the balance arm 50, when the latter swings in a clockwise direction under the influence of the counterweight 110 when unbalanced forces are created by substantially complete discharge of the treatment liquid 34 in the container 36. In the normal operation of the control apparatus the counterweight 110 is positioned on the balance arm 50 in such a manner that when the container 36 is filled with the treatment liquid or contains a quantity of the treatment liquid in excess of a predetermined minimum amount, for example a few grams of the liquid, the balance arm will assume the position wherein it is shown in Fig. 1 out of contact with the operating finger 118 of the microswitch 116 and in its position of rest in contact with the limit stop 113. Only when the container 36 has been substantially depleted of its treatment liquid will the balance arm 50 assume its other extreme position wherein it moves out of contact with the limit stop 113 and engages the operating finger 118 of the microswitch 116 to actuate the latter.

Referring now specifically to Fig. 3, it will be seen that the microswitch 116 is of the dual contact type and is provided with a normally open pair of contacts $C^1$ and a pair of normally closed contacts $C^2$, these contacts being adapted to become reversed upon depression of the operating finger 118. The normally closed contacts $C^2$ are disposed in an electrical circuit extending from the source S of electric current through the master control switch MS, leads 11, 13, contacts $C^2$, leads 15, 17, the electric motor M which drives the pump 12, leads 19, 21, 23, 25, and master switch MS back to the source. The normally closed contacts $C^2$ are also disposed in an electric circuit for the motor $M^1$ which drives the treatment liquid pump assembly 24, this circuit extending from the source through leads 11, 13, contacts $C^2$, leads 15, 27, 29, motor $M^1$ and leads 31, 25 back to the source. The normally closed contacts $C^2$ are disposed in a third electrical circuit designed when energized to actuate a signal lamp 120, this circuit extending from the source through leads 11, 13, contacts $C^2$, leads 15, 27, 33, lamp 120, leads 35, 23 and 25 to the source. The normally open contacts are disposed in a first electrical circuit designed upon energization thereof to actuate an audible signal producing device such as the bell 122. The contacts $C^1$ are also disposed in a similar circuit for rendering a visual signal by energizing a lamp 124. The first of these circuits extends from the source S through leads 11, 13, contacts $C^1$, leads 37, 39, the bell 122 and leads 41, 43, 21, 23, 25, back to the source. The second of these circuits extends from the source S through leads 11, 13, contacts $C^1$, leads 37, 45, the lamp 124, leads 47, 43, 21, 23, and 25 back to the source.

In the operation of the system, during normal running of the apparatus when the container 36 contains an adequate supply of the treatment liquid 34 the balance arm 50 will assume a position wherein it is shown in Figs. 1 and 3 in contact with the limit stop 113 and the contacts $C^1$ and $C^2$ will assume their normally open and normally closed positions respectively.

The circuits previously described for the two pump operating motors M and $M^1$ will thus remain closed so that both the water pump 12 and the treatment liquid pumping apparatus 24 will remain in operation. At the same time the circuit for the signal lamp 120 which, for convenience may be filtered to emit a green light, will be energized. Since the contacts $C^1$ remain open, neither the signal lamp 124, which preferably is provided with a filter adapted to produce a red signal light, nor the audible device 122 will be energized. At such time as the container 36 runs empty, the balance arm 50 will shift its position so as to engage the operating finger 118 of the microswitch 116 and reverse the contacts $C^1$ and $C^2$. With the contacts $C^2$ open under the influence of the balance arm 50, the electric circuits through the motors M and $M^1$ will become deenergized, thus stopping these motors and the pumps associated therewith, while at the same time closure of the contacts $C^1$ will energize the previously described circuits associated with the lamp 124 and audible signal 122.

A preferred form of the invention has been shown in the drawings and described herein, but it should be understood that the invention is not to be limited to the specific disclosure made, and that the appended claim should be construed as broadly as the prior art will permit.

I claim:

In a metering system for injecting treatment liquid from a source of such liquid into a moving stream of water, a water pump for effecting movement of said stream, an electric motor operatively connected to said water pump in driving relationship, a rectangular wall panel adapted to be placed in a vertical position and secured to a wall surface in parallelism therewith and in close proximity thereto, said panel being provided with a rectangular, vertically elongated, outwardly offset portion extending from the bottom edge of the panel to a region adjacent but below the top edge thereof, a metering pump for the treatment liquid mounted on said offset portion of the wall panel adjacent the bottom thereof, said metering pump including a pump chamber having a pump inlet, a pump outlet and a bleeder port in communication therewith, an electric motor mounted on said wall panel and operatively connected to said metering pump in driving relationship, an electric circuit for each of said motor, a balance arm pivoted medially of its ends to said wall panel above the level of said offset portion for swinging movements in opposite directions in a plane parallel to the plane of the wall panel and in close proximity thereto, one end region of said balance arm overhanging one vertical edge of the wall panel and the other end region thereof extending over said outwardly offset portion and overhanging the other vertical edge of the wall panel, a bottle-like container for said source of treatment liquid including a restricted neck portion having an open upper end, a forwardly offset collar on said overhanging end of the balance arm encircling said restricted neck portion of the container and serving to suspend the container therefrom beyond the rectangular confines of the wall panel and above the level of said pump chamber for movement bodily with the balance arm, a flexible conduit connecting said pump inlet with the bottom regions of said container, a second flexible conduit having one end thereof connected to said bleeder port and having its other end extending loosely through said open upper end of the container neck portion, a rigid conduit connecting said pump outlet and stream of water, a first energizeable signal device, an electric circuit for said signal device, a switch mounted on said wall panel and having a depressible actuating finger positioned in the path of movement of said balance arm, said balance arm being movable between a retracted position wherein it is out of contact with said actuating finger and an advanced position wherein it engages said actuating finger and depresses the same, said switch including a pair of normally closed contacts common to all of said electric circuits and operable when open to maintain the circuits deenergized and operable when closed to maintain the circuits energized, a second energizeable signal device, an electric circuit for said latter signal device, said switch including a pair of normally open contacts in said latter electric circuit and operable when open to maintain the latter electric circuit deenergized and when closed to maintain the latter electric circuit energized, said actuating finger, when depressed, reversing the positions of all of said pairs of contacts, and a counterbalancing weight adjustably mounted on the other end of said balance arm.

References Cited in the file of this patent

UNITED STATES PATENTS 682,480      Meyssonnier _____ Sept. 10, 1901

(Other references on following page)

UNITED STATES PATENTS

| | | |
|---|---|---|
| 868,464 | Mann | Oct. 15, 1907 |
| 1,961,350 | Grunsky | June 5, 1934 |
| 2,136,776 | Pugatz | Nov. 15, 1938 |
| 2,190,060 | Fager | Feb. 13, 1940 |
| 2,336,083 | Franz | Dec. 7, 1943 |
| 2,507,255 | Kaufman | May 9, 1950 |
| 2,837,239 | Scholin | June 3, 1958 |

FOREIGN PATENTS

| | | |
|---|---|---|
| 264,619 | Great Britain | Jan. 27, 1927 |
| 313,105 | Great Britain | June 7, 1929 |
| 400,270 | Germany | Aug. 23, 1924 |

OTHER REFERENCES

Milton Roy Co. Catalog No. 941, 1941, Milton Roy Co., Philadelphia, Pa.